(12) United States Patent
Yu

(10) Patent No.: US 12,461,551 B2
(45) Date of Patent: Nov. 4, 2025

(54) JOYSTICK

(71) Applicant: SHENZHEN GULI TECHNOLOGY CO., LTD., Shenzhen (CN)

(72) Inventor: Hongyong Yu, Shenzhen (CN)

(73) Assignee: SHENZHEN GULI TECHNOLOGY CO., LTD., Shenzhen (CN)

( * ) Notice: Subject to any disclaimer, the term of this patent is extended or adjusted under 35 U.S.C. 154(b) by 7 days.

(21) Appl. No.: 18/334,356

(22) Filed: Jun. 13, 2023

(65) Prior Publication Data
US 2024/0028064 A1 Jan. 25, 2024

(30) Foreign Application Priority Data
Jul. 20, 2022 (CN) .......................... 202221885604.5

(51) Int. Cl.
*G05G 5/05* (2006.01)
*G05G 9/047* (2006.01)

(52) U.S. Cl.
CPC .............. *G05G 9/047* (2013.01); *G05G 5/05* (2013.01); *G05G 2009/04718* (2013.01); *G05G 2505/00* (2013.01)

(58) Field of Classification Search
CPC .......... G05G 2009/04718; G05G 2009/04714; G05G 2009/04711; G05G 2009/04703; G05G 9/047
See application file for complete search history.

(56) References Cited

U.S. PATENT DOCUMENTS

| | | | |
|---|---|---|---|
| 10,347,445 B2 * | 7/2019 | Wu ......................... | G05G 9/047 |
| 11,042,179 B1 * | 6/2021 | Muranaka .............. | G05G 5/005 |
| 11,231,737 B2 * | 1/2022 | Asano ...................... | G05G 5/05 |

* cited by examiner

*Primary Examiner* — Gregory Robert Weber
(74) *Attorney, Agent, or Firm* — Hemisphere Law, PLLC; Zhigang Ma

(57) ABSTRACT

A joystick includes a main shaft, a first swinging component, a second swinging component, and an elastic component. The first swinging component is disposed on the main shaft, the main shaft is capable of driving the first swinging component to swing along a first direction. The second swinging component is disposed at one side of the main shaft distal from the first swinging component, the main shaft is capable of driving the second swinging component along a second direction. The first direction is perpendicular to the second direction in the same plane. The first swinging component includes a first limiting part, the elastic component abuts against the first limiting part. The second swinging component includes a second limiting part, and the elastic component abuts against a side surface of the second limiting part distal from the main shaft.

8 Claims, 4 Drawing Sheets

JOYSTICK

TECHNICAL FIELD

The present disclosure relates to a technical field of electronic external devices, and in particular to a joystick.

BACKGROUND

For the convenience of next use of users, joysticks need to automatically return to a central position after being used, so that a spring is disposed in each of the joysticks for automatically returning the joysticks. Currently, the spring in each of the joysticks is directly clamped on a main shaft, in a process that the joysticks automatically return to the central position, the main shaft needs to be pushed by the spring for returning an original position, and then the main shaft pushes a corresponding swinging component to return to an original position, the corresponding swinging component is capable of driving a Hall element to transmit a return signal to an electronic product, such that there are relatively more transmission times of the return signal, which results in a relatively larger error in the process that the joysticks automatically return to the central position.

SUMMARY

In view of above problems, the present disclosure provides a joystick in a smaller error.

The present disclosure provides a joystick, including a main shaft, a first swinging component, a second swinging component, and an elastic component. The first swinging component is disposed on the main shaft, the main shaft is capable of driving the first swinging component to swing along a first direction. The second swinging component is disposed at one side of the main shaft distal from the first swinging component, the main shaft is capable of driving the second swinging component along a second direction. The first direction is perpendicular to the second direction in the same plane. The first swinging component includes a first limiting part, the elastic component abuts against the first limiting part. The second swinging component includes a second limiting part, and the elastic component abuts against a side surface of the second limiting part distal from the main shaft.

Furthermore, the second swinging component further includes a first clamping part, the second limiting part is disposed on the first clamping part, and the second limiting part extends along the second direction toward a direction distal from the main shaft.

Furthermore, the joystick further includes a gasket, the gasket is disposed on the first limiting part and the second limiting part, and the gasket further abuts against the elastic component.

Furthermore, the main shaft includes a shaft part and a connecting part, the first swinging component is sleeved on the shaft part, the second swinging component is disposed at one side of the connecting part distal from the shaft part, a mounting hole is defined on the gasket, and the connecting part is disposed in the mounting hole.

Furthermore, the connecting part extends toward the elastic component to form a protrusion, and the protrusion is capable of clamping on the elastic component.

Furthermore, a first through hole is defined on the first swinging component, and the shaft part penetrates through the first through hole.

Furthermore, the second swinging part further includes a second clamping part, the second clamping part is disposed on the first clamping part. A first mounting groove and a second mounting groove are defined on a side surface of the connecting part distal from the shaft part. The first clamping part is disposed in the first mounting groove, and the second clamping part is disposed in the second mounting groove, so that the main shaft is capable of driving the second swinging component to swing along the second direction.

Furthermore, the joystick further includes a pressing component, and the second swinging component further includes a pressing-down part, the pressing-down part is disposed at one end of the first clamping part distal from the second clamping part, and the pressing-down part is capable of abutting against the pressing component.

Furthermore, the joystick further includes a housing body. The first swinging component, the second swinging component, and the elastic component are respectively disposed in the housing body. A second through hole is defined on the housing body, and the main shaft partially extends out of the second through hole and is further partially located outside the housing body.

Furthermore, a concave groove is defined on a side surface of the gasket distal from the second limiting part, and the elastic component is capable of clamping in the concave groove.

Embodiments of the present disclosure have at least following beneficial effects.

The elastic component directly abuts against the first limiting part of the first swinging component and the second limiting part of the second swinging component, and when the joystick is pushed by an external force in a certain direction, the first swinging component or the second swinging component presses the elastic component and drives a position where the elastic component abuts against the first swinging component or the second swinging component to tilt in a pushing direction. Therefore, in a process that the joystick automatically returns to a central position, the elastic component may directly push the first swinging component or the second swinging component, and the first swinging component or the second swinging component transmits a return signal to an electronic product through a Hall element. Compared with a three-stage signal transmission in the prior art, the present disclosure effectively reduces steps of mechanical signal transmission, which reduces an error in the process that the joystick automatically returns to the central position and is accurate in operation.

BRIEF DESCRIPTION OF DRAWINGS

In order to more clearly illustrate embodiments of the present disclosure or technical solutions in the prior art, drawings that need to be used in the embodiments or the prior art are briefly described below, and it is obvious that accompanying drawings in following description are merely some embodiments of the present disclosure, and those who skilled in the art may obtain other drawings according to these drawings without involving any inventive effort.

Figure 1:
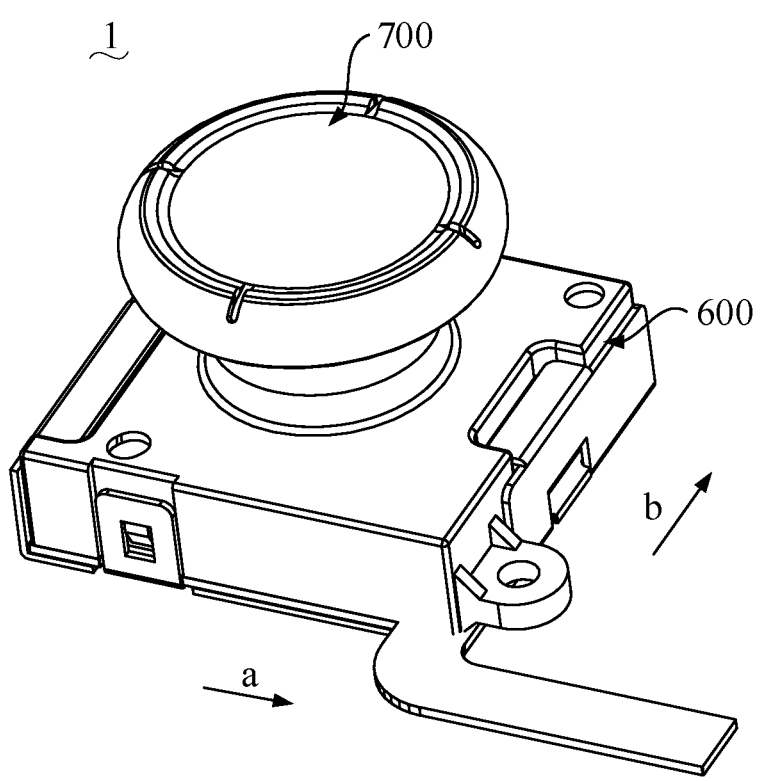
FIG. 1 is an overall structural schematic diagram of a joystick according to one embodiment of the present disclosure.

Reference numerals in the drawings: 1. joystick; a. first direction; b. second direction; c. third direction; 100. main shaft; 110. shaft part; 120. connecting part; 121. protrusion; 101. first mounting groove; 102. second mounting groove; 200. first swinging component; 201. first through hole; 10. first supporting part; 220. second supporting part; 221. first connecting shaft; 222. swinging end; 230. third supporting part; 231. second connecting shaft; 232. transmission component; 233. first protruding part; 240. first limiting part; 300. second swinging component; 310. first clamping part; 311. support part; 312. first swinging part; 313. second protruding part; 320. second clamping part; 321. second swinging part; 322. abutting part; 330. second limiting part; 340. pressing-down part; 410. elastic component; 420. pressing component; 430. pressing groove; 500. gasket; 501. mounting hole; 502. concave groove; 600. housing body; 601. second through hole; 610. upper housing; 620. lower housing; 700. joystick head assembly; 710. joystick cover; 720. joystick head; 730. dust-proof component; 800. first sensing assembly; 810. first sliding component; 820. first magnetic component; 830. first sensing component; 900. second sensing assembly; 910. second sliding component; 920. second magnetic component; 930. second sensing component.

DETAILED DESCRIPTION

In order to enable those who skilled in the art to better understand technical solutions in the present application, the technical solutions in the embodiments of the present disclosure are clearly and completely described below with reference to accompanying drawings in the embodiments of the present disclosure. All other embodiments obtained by those who skilled in the art based on the embodiments of the present disclosure without creative efforts shall fall within protection scopes of the present disclosure.

It should be noted that when a component is referred to as being "fixed to" or "disposed on" another component, it may be directly or indirectly disposed on another component; when one component is referred to as being "connected to" another component, it may be directly connected to another component or indirectly connected to another component.

It should be understood that orientation or positional relationships indicated by terms "length", "width", "upper", "lower", "front", "rear", "left", "right", "vertical", "horizontal", "top", "bottom", "inner", "outer", etc. are based on the orientation or positional relationships shown in the drawings, rather than indicating or implying that indicated devices or components must have a particular orientation, for being constructed and operated in the particular orientation, and therefore cannot be understood as a limitation to the present disclosure.

In addition, terms "first" and "second" are used for descriptive purposes only and cannot be understood as indicating or implying relative importance or implicitly indicating the number of indicated technical features. Therefore, the features defined with "first" and "second" may explicitly or implicitly include one or more of the features. In the description of the present disclosure, "multiple" and "a plurality of" mean two or more, unless specifically defined otherwise.

It can be seen that structures, proportions, sizes, etc. shown in the drawings of the present specification are only used to cooperate with the content disclosed in the description, so as to be understood and read by those who skilled in the art, and are not intended to limit the definition conditions that can be implemented in the present disclosure. Therefore, there is no substantial meaning in the art. Any modification, proportional relationship change, or size adjustment on the structures should still fall within the scope covered by the technical content disclosed in the present disclosure without affecting the effects that can be generated by the present disclosure and the purpose that can be achieved.

Figure 2:
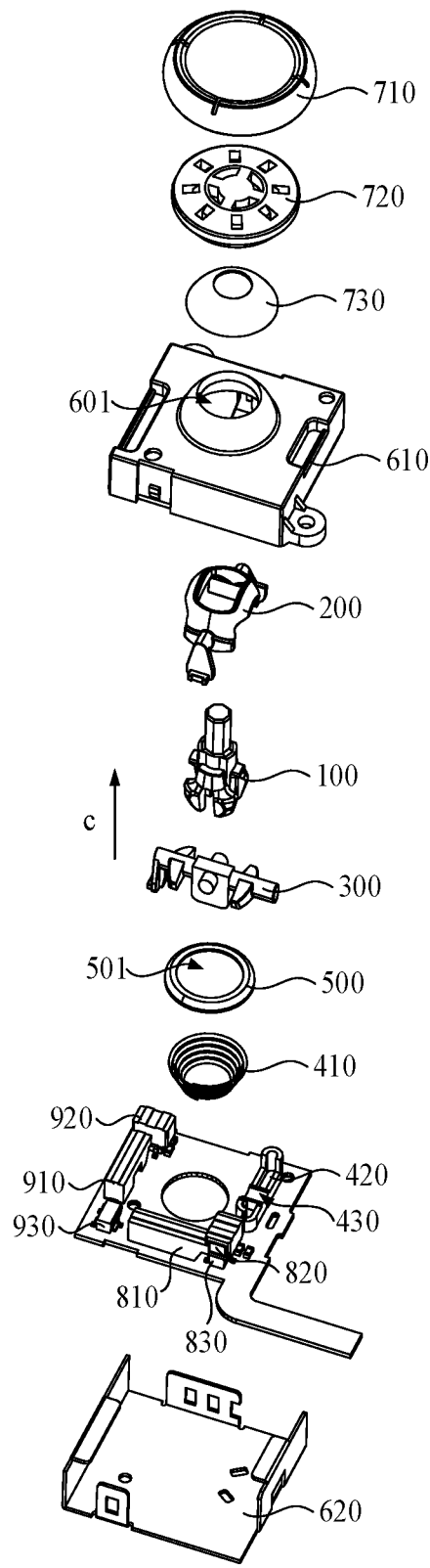
FIG. 2 is an exploded structural schematic diagram of the joystick according to one embodiment of the present disclosure.
Figure 3:
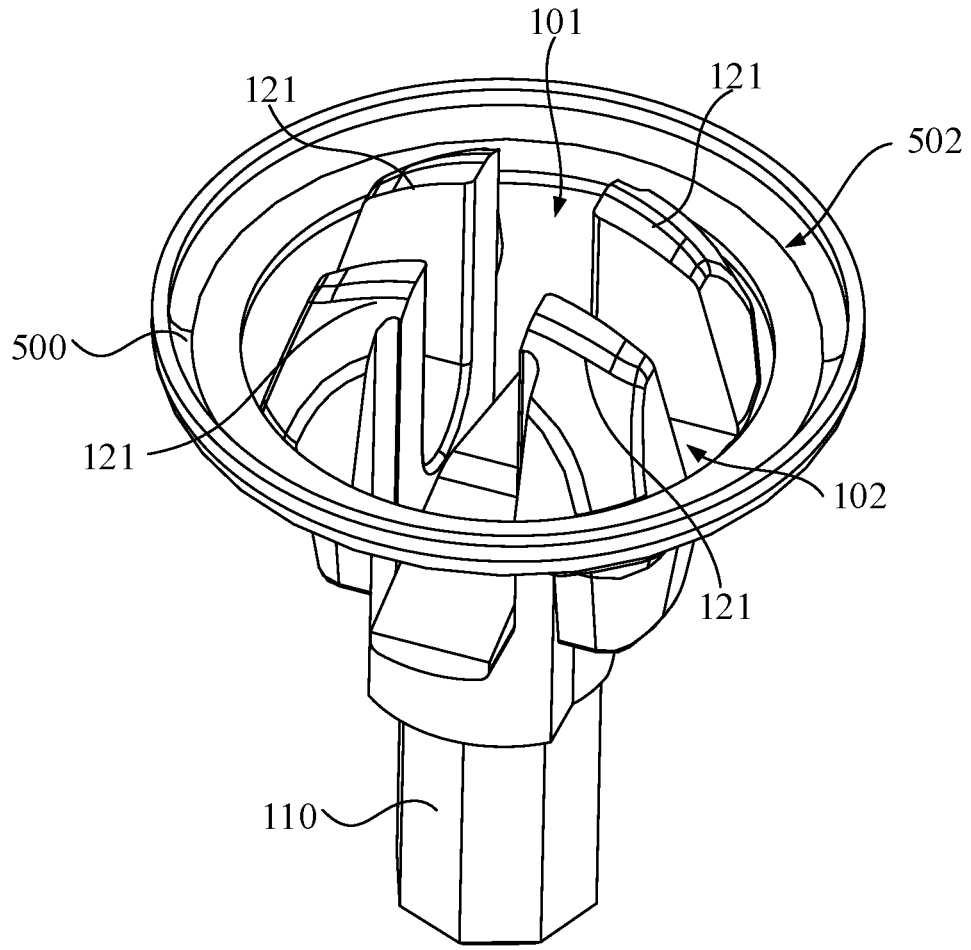
FIG. 3 is a partial structural schematic diagram of the joystick according to one embodiment of the present disclosure.
Figure 4:
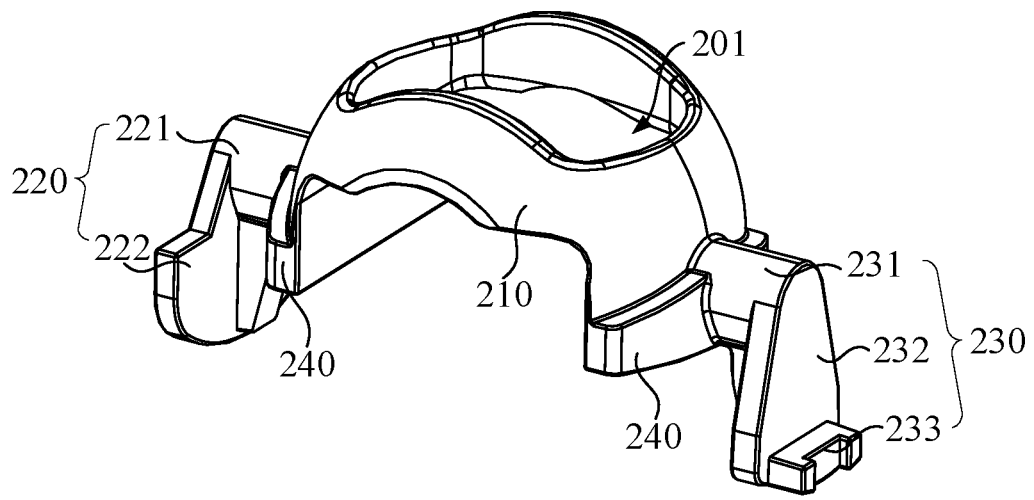
FIG. 4 is an overall structural schematic diagram of a first swinging component according to one embodiment of the present disclosure.
Figure 5:
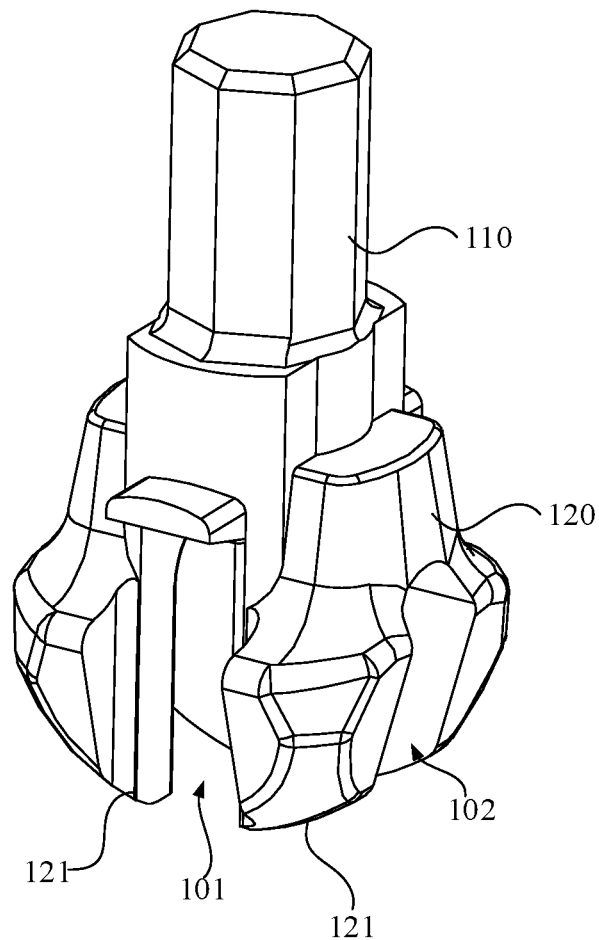
FIG. 5 is an overall structural schematic diagram of a main shaft according to one embodiment of the present disclosure.
Figure 6:
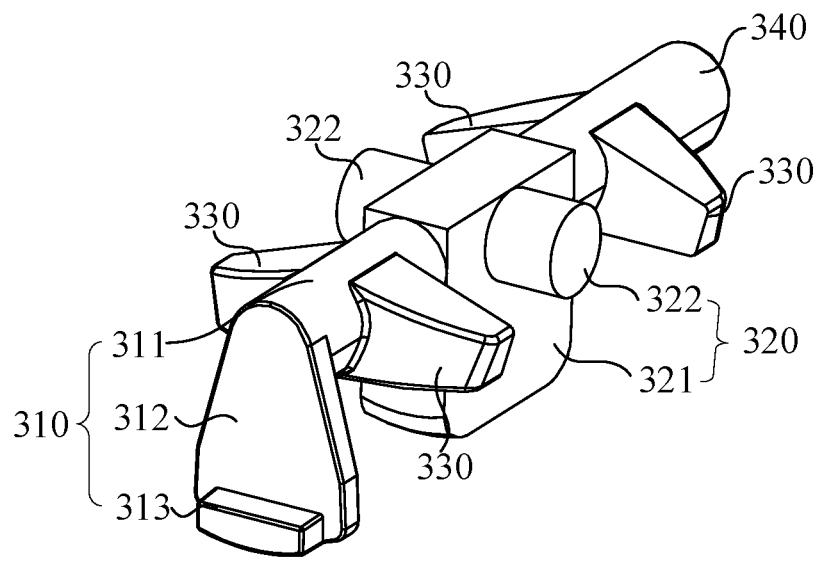
FIG. 6 is an overall structural schematic diagram of a second swinging component according to one embodiment of the present disclosure.

As shown in FIGS. 1-6, the present disclosure provides a joystick 1, including a main shaft 100, a first swinging component 200, a second swinging component 300, and an elastic component 410. The first swinging component 200 is disposed on the main shaft 100, the main shaft 100 is capable of driving the first swinging component 200 to swing along a first direction a. The second swinging component 300 is disposed at one side of the main shaft 100 distal from the first swinging component 200, the main shaft 100 is capable of driving the second swinging component 300 along a second direction b. The first direction a is perpendicular to the second direction b in the same plane.

Furthermore, the first swinging component 200 includes a first limiting part 240, the second swinging component 300 includes a second limiting part 330, and the elastic component 410 respectively abuts against the first limiting part 240 and a side surface of the second limiting part 330 distal from the main shaft 100. Therefore, when users operate the joystick 1, the main shaft 100 may be offset with respect to a center shaft under an action of an external force, and the first swinging component 200 or the second swinging component 300 may respectively press the elastic component 410 and deform the elastic component 410, and further transmit information, such as inclination angle and duration for maintaining the inclination angle, to sensing elements. When the users set the main shaft 100 of the joystick 1 free, the elastic component 410 has a trend of returning to an original state, and is capable of pushing the first swinging component 200 or the second swinging component 300 to return to an original position, and the joystick 1 returns to a central position. At this time, the first swinging component 200 and the second swinging component 300 may directly transmit action information to the sensing elements.

Furthermore, the joystick 1 further includes a gasket 500, the gasket 500 is disposed on the first limiting part 240 and the second limiting part 330, and the gasket 500 further abuts against the elastic component 410. The gasket 500 may increase a contact area with the elastic component 410, and may also fully support the first limiting part 240 and the second limiting part 330, which provides a more accurate transmission.

Furthermore, a concave groove 502 is defined on a side surface of the gasket 500 distal from the second limiting part 330, and the elastic component 410 is capable of clamping in the concave groove 502, so that the elastic component 410 may not be easily separated from the gasket 500, and a structure is more stable.

Optionally, the elastic component 410 is a disc-shaped spring or a tower-shaped spring.

Furthermore, the main shaft 100 includes a shaft part 110 and a connecting part 120, the shaft part 110 is generally a rod-shaped structure extending in a vertical direction, the connecting part 120 is generally a spherical-like structure defining a groove, and a geometric center of the shaft part 110 coincides with a projection of a geometric center of the connecting part 120. In one or more embodiments, in the same plane, a first mounting groove 101 and a second mounting groove 102 are defined on a side surface of the connecting part 120 distal from the shaft part 110, the first mounting groove 101 is perpendicular to the second mounting groove 102, and the first mounting groove 101 is communicated with the second mounting groove 102. An extending direction of the first mounting groove 101 is the first direction a, an extending direction of the second mounting groove 102 is the second direction b, an extending direction of the shaft part 110 is perpendicular to the plane, and the extending direction of the shaft part 110 is a third direction c.

Furthermore, the first swinging component 200 is sleeved on the shaft part 110, the second swinging component 300 is disposed at one side of the connecting part 120 distal from the shaft part 110, a mounting hole 501 is defined on the gasket 500, and the connecting part 120 is disposed in the mounting hole 501 and has a certain distance from the gasket 500.

Furthermore, the connecting part 120 extends toward the elastic component 140 to form a protrusion 121, and the protrusion 121 is capable of clamping on the elastic component 410.

Furthermore, a first through hole 201 is defined on the first swinging component 200, and the shaft part 110 penetrates through the first through hole 201, so as to sleeve the first swinging component 200 on the main shaft 100 along the third direction c.

Furthermore, the first swinging component 200 includes a first supporting part 210, a second supporting part 220, and a third supporting part 230, moreover, along the third direction, the first through hole 201 is defined on the first supporting part 210, and the shaft part 110 is capable of penetrating through the first supporting part 210. Along the second direction b, the second supporting part 220 and the third supporting part 230 are respectively disposed at two opposite ends of the first supporting part 210, a first end of the second supporting part 220 is disposed at a first side of the first supporting part 210, a first end of the third supporting part 230 is disposed at a second side of the first supporting part 210, a second end of the second supporting part 220 and a second end of the third supporting part 230 respectively swingably abut against a bottom of a lower housing 620.

Furthermore, the second supporting part 220 includes a first connecting shaft 221 and a swinging end 222, the first connecting shaft 221 is generally a columnar structure extending along the second direction b, a first end of the first connecting shaft 221 is disposed on the first supporting part 210, the swinging end 222 is disposed at a second end of the first connecting shaft 221 and swingably abuts against the bottom of the lower housing 620.

Furthermore, a side surface of the swinging end 222 close to the bottom of the lower housing 620 is an arc surface.

Furthermore, the third supporting part 230 includes a second connecting shaft 231, a transmission component 232, and a first protruding part 233. The second connecting shaft 231 is generally a columnar structure extending in the second direction b, a first end of the second connecting shaft 231 is disposed on the first supporting part 210, the transmission component 232 is disposed at a second end of the second connecting shaft 231 and swingably abuts against the bottom of the lower housing 620. The first protruding part 233 is located at a side surface of the transmission component 232 distal from the first supporting part 210 and is close to the lower housing 620, the first protruding part 233 is capable of clamping on a first sliding component 810 and driving the first sliding component 810 to slide along the first direction a.

Furthermore, the second swinging component 300 further includes a first clamping part 310, the second limiting part 330 is disposed on the first clamping part 310, and the second limiting part 330 extends toward a direction distal from the main shaft 100 along the second direction b.

Furthermore, the second swinging component 300 further includes a second clamping part 320, the second clamping part 320 is disposed on the first clamping part 310, the first clamping part 310 is disposed in the first mounting groove 101, the second clamping part 320 is disposed in the second mounting groove 102, so as to enable the main shaft 100 to drive the second swinging component 300 to swing along the second direction b. The second swinging component 300 is disposed at a connecting part 120 of the main shaft 100. Therefore, when assembling the joystick 1, the second swinging component 300 may be first assembled, and then the main shaft 100 is assembled on the second swinging component 300 along the third direction c, and finally, the upper housing 610 is fastened with the lower housing 620. Such structure is convenient for assembling, and is further convenient for replacing different joystick head assemblies 700.

Furthermore, the joystick 1 further includes a pressing component 420, and the second swinging component 300 further includes a pressing-down part 340, the pressing-down part 340 is disposed at one end of the first clamping part 310 distal from the second clamping part 320, and the pressing-down part 340 is capable of abutting against the pressing component 420. When the users press the main shaft 100 down, the main shaft 100 may further press the second swinging component 300 and enable the pressing-down part 340 to be clamped in a pressing groove 430 of the pressing component 420, a pressure sensing component (not shown in the drawings) is disposed in the pressing groove 430, and the pressure sensing component may sense information, such as a pressing period or a pressing force, and transmit the information to an electronic product.

Furthermore, the first clamping part 310 includes a support part 311 and a first swinging part 312, the pressing-down part 340 is disposed on the support part 3110 and is located in the pressing groove 430, the first swinging part 312 is swingably disposed at the bottom of the lower housing 620.

Furthermore, a side surface of the first swinging part 312 close to the bottom of the lower housing 620 is an arc surface.

Furthermore, the joystick 1 further includes a second protruding part 313, the second protruding part 313 is disposed at a side surface of the first swinging part 312 distal from the second clamping part 320 and is close to the bottom of the lower housing 620, the second protruding part 313 is capable of clamping on the second sliding component 910 and drives the second sliding component 910 to linearly slide in the second direction b.

Furthermore, the second clamping part 320 includes a second swinging part 321 and an abutting part 322, the abutting part 322 extends toward a direction distal from the second swinging part 321 along the second direction b. The first clamping part 310 penetrates through the second swinging part 320 along the first direction a, and a side surface of the second swinging part 321 distal from the first clamping part 310 is swingably abutted against the bottom of the lower housing 620.

Furthermore, the joystick 1 further includes a housing body 600. The first swinging component 200, a second swinging component 300, and an elastic component 410 are respectively disposed in the housing body 600. A second through hole 601 is defined on the housing body 600, and the main shaft 100 partially extends out of the second through hole 601 and is further partially located outside the housing body 600.

Furthermore, the housing body 600 includes the upper housing 610 and the lower housing 620. In one or more embodiments, a buckle structure is provided between the upper housing 610 and the lower housing 620, and the main shaft 100 is capable of partially clamping in the upper housing 610, so that the main shaft may not easily dislocate when using the joystick 1, and the joystick 1 is effectively prevented from drifting.

Furthermore, the joystick 1 further includes a joystick head assembly 700. The joystick head assembly 700 is detachably disposed at one end of the shaft part 110 distal from the connecting part 120. Therefore, when assembling the joystick 1, an interior structure the joystick may be first assembled, and then the joystick head assembly 700 is disposed at a portion of the shaft part 110 extending out of the upper housing 610. The joystick head assembly 700 includes a joystick cover 710 and a joystick head 720, the joystick head 720 is capable of being sleeved on the shaft part 110, the joystick cover 710 is disposed at a side surface of the joystick head 720 distal from the shaft part 110.

Furthermore, the joystick head assembly 700 further includes a dust-proof component 730, the dust-proof component 730 is disposed between the joystick head 720 and the upper housing 610, so as to prevent dust from entering a gap between the joystick head assembly 700 and the housing body 600, which is convenient for cleaning.

Furthermore, the joystick 1 further includes a first sensing assembly 800 and a second sensing assembly 900. The first sensing assembly 800 includes a first sliding component 810, a first magnetic component 820, and a first sensing component 830. The first sliding component 810 is connected to the second swinging component 300, when the second swinging component 300 swings, the first sliding component 810 may linearly slide in the third direction c. The first magnetic component 820 is disposed in the first sliding component 810 and is configured to detect a sliding amplitude of the first sliding component 810, and the first sensing component 830 is configured to receive signals generated by the first magnetic component 820. The second sensing assembly 900 includes a second sliding component 910, a second magnetic component 920, and a second sensing component 930. The second sliding component 910 is connected to the first swinging component 200, when the first swinging component 200 swings, the second sliding component 910 may linearly slide in the second direction b. The second magnetic component 920 is disposed in the second sliding component 910 and is configured to detect a sliding amplitude of the second sliding component 910, and the second sensing component 930 is configured to receive signals generated by the second magnetic component 920.

Furthermore, the joystick 1 further includes a main control component (not shown in the drawings) and a signal output component, the main control component is respectively connected to the first sensing component 830 and the second sensing component 930, and the signal output component is connected to the main control component. The main control component is capable of receiving signals transmitted from the first sensing component 830 and the second sensing component 930 and controlling the signal output component to output signals to the outside.

Optionally, the signal output component may be a flexible flat cable or a hard board pin.

In one or more embodiments, both the first sensing component 830 and the second sensing component 930 are linear Hall magnetic induction sensing components, and both the sensing component 830 and the second sensing component 930 are packaged as chips and are disposed on a circuit board below the main shaft 100. In other embodiments, both the first sensing component 830 and the second sensing component 930 are sliding resistor sensing components. The first sensing component 830 includes a first contact component (not shown in the drawings) and a first resistor (not shown in the drawings), the first contact component is disposed at a bottom end of the first sliding component 810, and the first resistor is disposed below the first sliding component 810. The second sensing component 930 includes a second contact component (not shown in the drawings) and a second resistor (not shown in the drawings), the second contact component is disposed at a bottom end of the second sliding component 910, and the second resistor is disposed below the second sliding component 910. The first resistor and the second resistor are disposed on the circuit board below the main shaft 100.

The first clamping part is disposed in the first mounting groove, and the second clamping part is disposed in the second mounting groove, so that the main shaft is capable of driving the second swinging component to swing along the second direction.

Optionally, the first resistor and the second resistor are both carbon film resistors.

According to the present disclosure, the elastic component 410 directly abuts against the first limiting part 240 of the first swinging component 200 and the second limiting part 330 of the second swinging component 300, and when the joystick 1 is pushed by an external force in a certain direction, the first swinging component 200 or the second swinging component 300 presses the elastic component 410 and drives a position where the elastic component 410 abuts against the first swinging component 200 or the second swinging component 300 to tilt in a pushing direction. Therefore, in a process that the joystick 1 automatically returns to a central position, the elastic component 410 may directly push the first swinging component 200 or the second swinging component 300, and the first swinging component 200 or the second swinging component 300 transmits a return signal to an electronic product through a Hall element. Compared with a three-stage signal transmission in the prior art, the present disclosure effectively reduces steps of mechanical signal transmission, which reduces an error in the process that the joystick 1 automatically returns to the central position and is accurate in operation.

Above description of the disclosed embodiments enables those who skilled in the art to implement or use the present disclosure. Various modifications to these embodiments may be apparent to those who skilled in the art, and general principles defined herein may be implemented in other embodiments without departing from the spirit or scope of the present disclosure. Therefore, the present disclosure may not be limited to these embodiments shown herein, but is to be accorded the widest scope consistent with principles and novel features disclosed herein.

What is claimed is:
1. A joystick, comprising:
   a main shaft, comprising a shaft part and a connecting part;
   a first swinging component, sleeved on the shaft part; wherein the main shaft is configured to drive the first swinging component to swing along a first direction, and the first swinging component comprises a first limiting part;
   a second swinging component, disposed at one side of the connecting part distal from the shaft part; wherein the main shaft is configured to drive the second swinging component along a second direction, the first direction is perpendicular to the second direction, and the second swinging component comprises a second limiting part;
   a gasket, disposed on the first limiting part and the second limiting part;
   an elastic component, wherein the elastic component abuts against the first limiting part via the gasket, and the elastic component abuts against a side surface of the second limiting part distal from the main shaft via the gasket; and
   wherein the connecting part extends toward the elastic component to form a protrusion, and the protrusion is configured to penetrate through the gasket and to be clamped by the elastic component.

2. The joystick according to claim 1, wherein the second swinging component further comprises a first clamping part, the second limiting part is disposed on the first clamping part, and the second limiting part extends along the second direction toward a direction distal from the main shaft.

3. The joystick according to claim 1, wherein a mounting hole is defined on the gasket, and the connecting part is disposed in the mounting hole.

4. The joystick according to claim 3, wherein a first through hole is defined on the first swinging component, and the shaft part penetrates through the first through hole.

5. The joystick according to claim 3, wherein the second swinging component further comprises a second clamping part, the second clamping part is disposed on the first clamping part; a first mounting groove and a second mounting groove are defined on a side surface of the connecting part distal from the shaft part; the first clamping part is disposed in the first mounting groove, and the second clamping part is disposed in the second mounting groove, so that the main shaft is capable of driving the second swinging component to swing along the second direction.

6. The joystick according to claim 5, wherein the joystick further comprises a pressing component, and the second swinging component further comprises a pressing-down part, the pressing-down part is disposed at one end of the first clamping part distal from the second clamping part, and the pressing-down part is capable of abutting against the pressing component.

7. The joystick according to claim 3, wherein the joystick further comprises a housing body; the first swinging component, the second swinging component, and the elastic component are respectively disposed in the housing body; a second through hole is defined on the housing body, and the main shaft partially extends out of the second through hole and is further partially located outside the housing body.

8. The joystick according to claim 1, wherein a concave groove is defined on a side surface of the gasket distal from the second limiting part, and the elastic component is capable of clamping in the concave groove.

* * * * *